Dec. 1, 1959 V. T. GROVER 2,915,166
COLLAR ORIENTING APPARATUS
Filed July 3, 1957 5 Sheets-Sheet 1
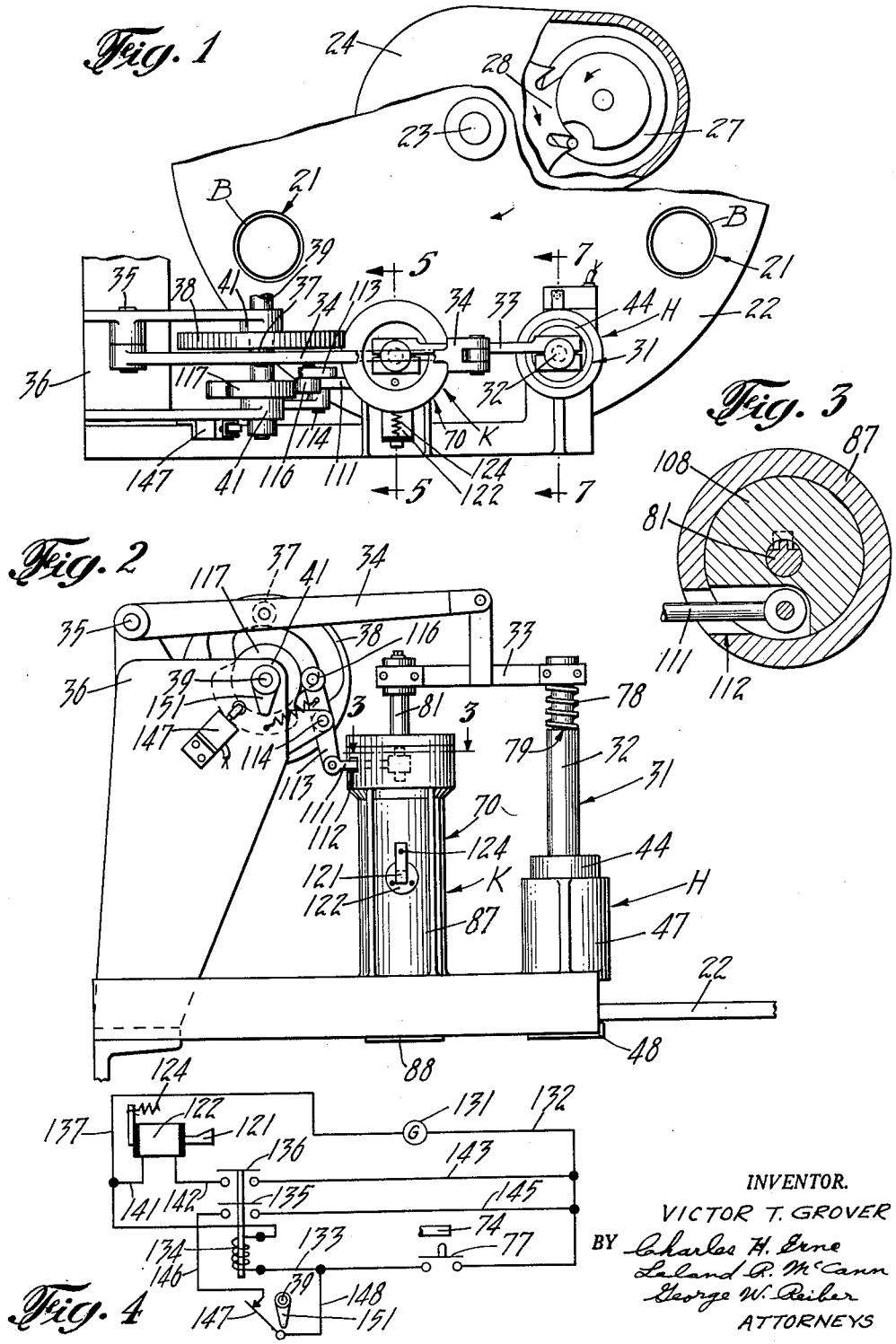
INVENTOR.
VICTOR T. GROVER
BY Charles H. Erne
Leland R. McCann
George W. Reiber
ATTORNEYS

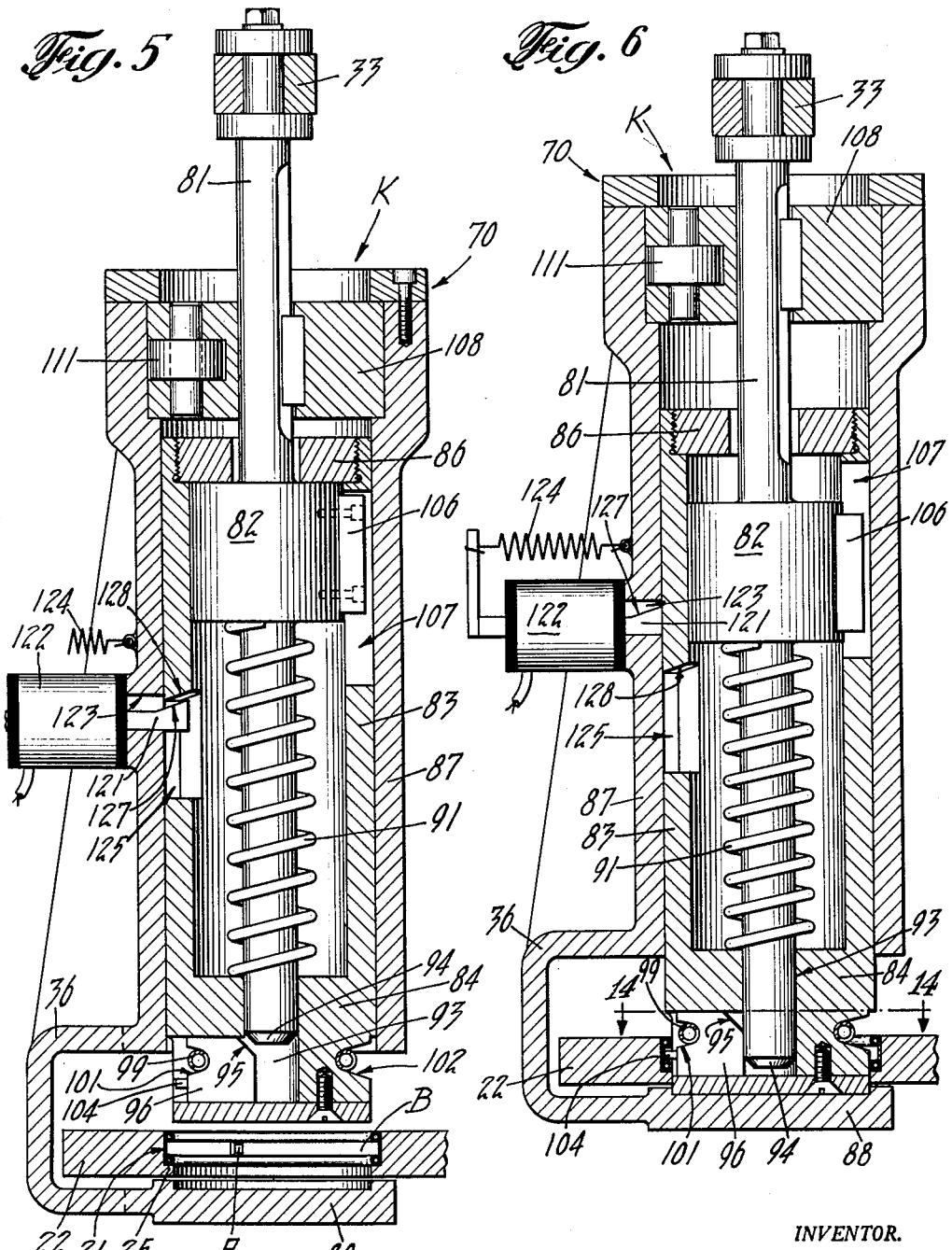

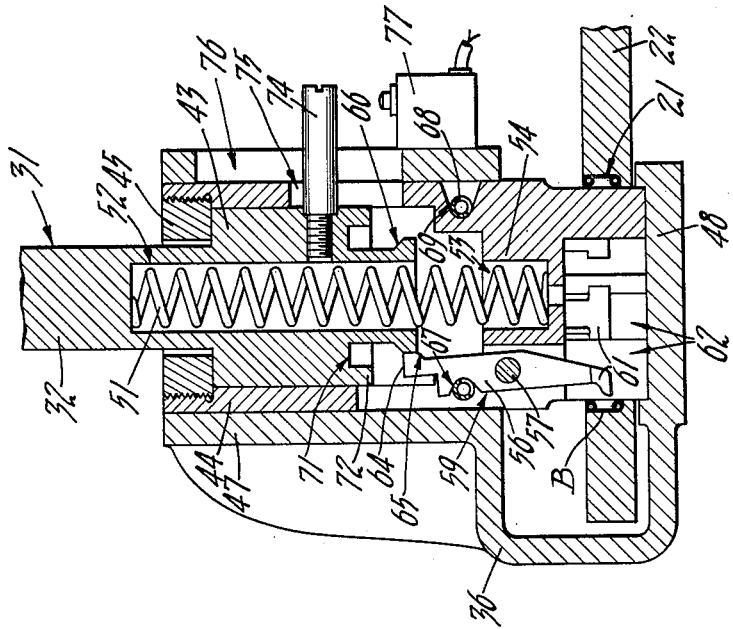

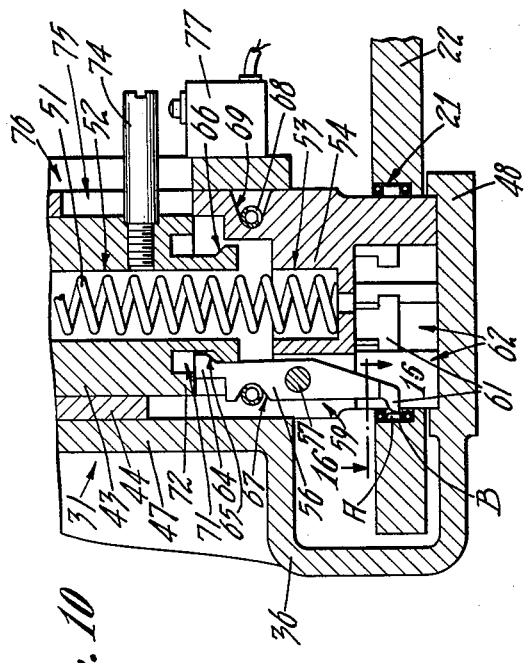

Dec. 1, 1959 V. T. GROVER 2,915,166
COLLAR ORIENTING APPARATUS
Filed July 3, 1957 5 Sheets-Sheet 5
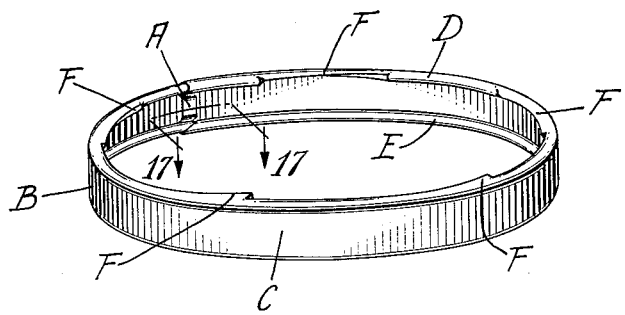
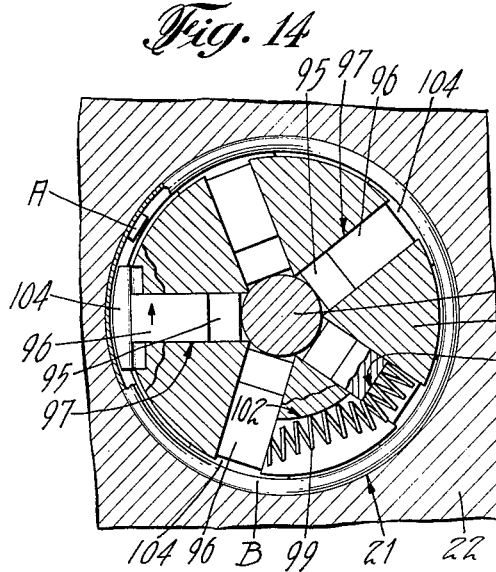
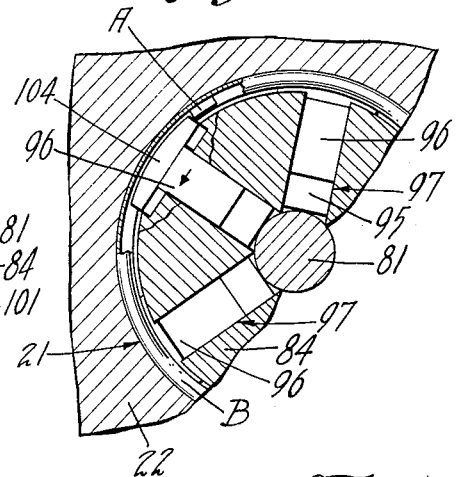
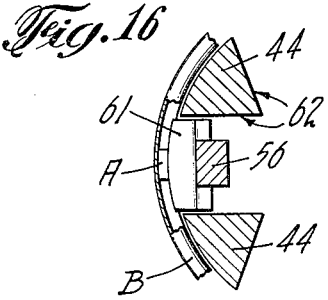
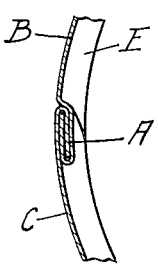
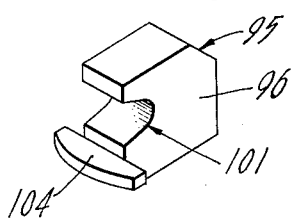
INVENTOR.
VICTOR T. GROVER
BY Charles H. Erne
Leland R. McCann
George W. Reiber
ATTORNEYS

United States Patent Office 2,915,166
Patented Dec. 1, 1959

2,915,166

COLLAR ORIENTING APPARATUS

Victor T. Grover, Maplewood, N.J., assignor to American Can Company, New York, N.Y., a corporation of New Jersey Application July 3, 1957, Serial No. 669,739

18 Claims. (Cl. 198—33)

The present invention relates to an apparatus for orienting articles such as containers or container parts relative to a projection thereon and has particular reference to devices for engaging the projection to turn the article into a position where the projection is located in a non-interfering position for a subsequent operation to be performed on the article.

In the manufacture of sheet metal cans or containers, an internal collar is frequently incorporated in the structure for various purposes such as a seating element for the covers of tearing strip coffee cans and the like. As an alternative, the upper portion of the container body may be used as a cover seat. In some cases the upper edge of the collar or body is formed with lugs to provide for screwing a reclosure cover in place on the can. Such collars or bodies usually are made from strip-like blanks which are bent into cylindrical shape, with the ends of the blanks united in a suitable seam to hold them together. The seam often creates an undesirable projection, which usually is located on the inner face of the collar or body. Where a subsequent operation is performed on the collar or body, which involves the avoidance of the inwardly projecting seam, considerable difficulty is experienced in high speed automatic machinery in locating the seam and setting it into a non-interfering position so that the subsequent operation may be effected in a proper manner.

It is an object of the instant invention to provide an efficient apparatus for rotating articles received in an uncontrolled relation, into a position where any projections thereon may be readily relocated in a predetermined non-interfering position so that a subsequent operation may be performed on the article without interfering with the projection.

Another object is to provide such an apparatus which includes devices for detecting the projection location, so that if a projection is already in a non-interfering position, orientation of the article may be annulled.

Another object is to provide for the detection and the orientation of articles moving along a path of travel in processional order so as to accomplish orientation if necessary at a high rate of speed to maintain synchronism with the subsequent operation devices.

Numerous other objects and advantages of the invention will be apparent as it is better understood from the following description, which, taken in connection with the accompanying drawings, discloses a preferred embodiment thereof.

Referring to the drawings:

Figure 1 is a top plan view of an apparatus embodying the instant invention, with parts broken away;

Fig. 2 is an elevational view of the apparatus shown in Fig. 1;

Fig. 3 is an enlarged sectional detail view taken substantially along the line 3—3 in Fig. 2;

Fig. 4 is a wiring diagram of the electric devices used in the apparatus;

Figs. 5 and 6 are enlarged sectional views of an orienting device, the views being taken substantially along the line 5—5 in Fig. 1 and showing parts of the device in different positions;

Figs. 7, 8, 9 and 10 are enlarged sectional views of a detecting device with parts shown in different positions during its operation, the views being taken substantially along the line 7—7 in Fig. 1, parts being broken away;

Figs. 11 and 12 are sectional detail views taken substantially along the respective lines 11—11, 12—12 in Fig. 7;

Fig. 13 is an enlarged perspective view of a collar to be oriented in the apparatus shown in Fig. 1;

Figs. 14 and 15 are enlarged sectional views taken substantially along the line 14—14 in Fig. 6, the two views showing different positions of parts of the orienting device, with parts broken away;

Fig. 16 is an enlarged fragmentary sectional view taken substantially along the line 16—16 in Fig. 10;

Fig. 17 is an enlarged sectional view taken substantially along a plane indicated by the lines 17—17 in Fig. 13; and Fig. 18 is an enlarged perspective view of one of the orienting fingers shown in Figs. 5, 6, 14 and 15.

As a preferred and exemplary embodiment of the instant invention the drawings illustrate a detecting device 31 and a cooperating orienting device 70 arranged in a conventional apparatus such as a punch press or the like for detecting a projection A (Figs. 13 and 17) on a sheet metal collar B and for orienting the collar so as to relocate the projection, if necessary, in a position which will not interfere with a subsequent operation to be performed on the collar.

By way of example, the collar B shown in the drawings is an annular collar made from a flat strip of material and when formed into shape comprises a vertical side wall C having its upper and lower marginal edges bent inwardly to produce smooth edge curls D, E, the ends of the strip being permanently united in any suitable manner, such as by an inwardly projecting conventional lock and lap seam which constitutes the projection A. Such a collar B is a conventional part commonly used in sheet metal tearing strip cans or containers utilized for coffee, Crisco and other well-known products.

In cases where the collar B after assembly with a can is utilized to support and lock a reclosure cover in place when the can is opened, the upper curled edge D of the collar is reformed to provide a series of locking lugs F spaced around the periphery of the collar. The drawing shows five of these lugs F, each lug extending over approximately 36 degrees of the circumference of the collar with a 36 degree space between adjacent lugs.

The locking lugs F usually are produced by die action in the press and by flattening spaced portions of the edge curl D, either horizontally or vertically. The dies form no part of the instant invention and are not shown. In the automatic handling of the collars B at high speed, to feed them into the dies for this lug forming operation, it is impossible to control the location of the seam projection A and hence when the collar is received in its die, the seam projection A quite frequently is in vertical alignment with a potential lug F and therefore is in the wrong place circumferentially of the collar and interferes with the die operation to form the lugs F. In a non-interfering position the projection A should be located in one of the 36 degree spaces between any two adjacent lugs.

In the instant invention, a collar B when received for die action is first tested to detect the location of the seam projection A. If the detecting device 31 detects the projection in the wrong place, i.e. in a place where it aligns with lug forming elements on the die, the detector device sets in motion devices which control the orienting device 70 at a subsequent station, to cause the orienting device when the collar arrives at that station, to laterally engage the projection A and turn or orient the collar through a predetermined angular distance approximately 36 degrees to relocate the projection in a position where it will be between the lugs F to be formed and will thereby be out of the way of the lug forming elements of the die.

In case the projection A on a collar B is in a proper non-interfering position when the collar is first received, the detector device 31 detects this position of the projection and relays an action to the orienting device 70 at its subsequent station to hold the orienting device inoperative for this one collar and thereby leave the projection in its proper position. Thus breakage of die and orienting device parts and damage to collars is prevented.

In the drawings, Figs. 1 and 2 illustrate principal parts of a conventional punch press in which the collars B uncontrolled relative to the position of their projections A are fed into spaced circular pockets or holders 21 arranged in a circle in processional order adjacent the outer periphery of an intermittently rotatable horizontal movable member or disc 22 mounted on a vertical shaft 23 journaled in bearings in a frame 24 which constitutes the frame of the press. The collars B are fed into the holders 21 in any conventional manner, the holders supporting the collars circumferentially as shown in Fig. 5 and having bottom ledges 25 for supporting the collars vertically against displacement from the bottom of the holders. Where a projection is on the outer face of a collar, the holder 21 may be a post instead of a pocket.

The disc 22 is rotated in time with the other parts of the press in any conventional manner, as by a continuously rotating Geneva plate 27 (Fig. 1) which meshes with a Geneva indexing wheel 28 on the vertical shaft 23 to index the holders or collar pockets 21 into and through a plurality of working stations disposed above the path of travel of the holders for performing the various operations upon the collars B in proper sequence.

A collar B deposited in a holder 21 in the disc 22 is first indexed into a detecting station H where the holder is brought to rest directly under and in axial or vertical alignment with the detecting device or head 31 (Figs. 1 and 2). This detecting head 31 preferably comprises a vertical, axially movable stem 32 which is reciprocated in time with the indexing of the collar holders 21 into and out of the detecting station H. For this purpose the upper end of the stem 32 is attached to a horizontal crossbar 33 which is pivotally connected to one end of an actuating lever 34 mounted at its opposite end on a pivot pin 35 carried in a sub-frame 36 which extends from the press frame 24. Intermediate its ends, the actuating lever 34 carries a cam roller 37 which rides on a continuously rotating face cam 38. The cam 38 is mounted on a cam shaft 39 journaled in bearings 41 in the sub-frame 36. The shaft 39 is rotated in any suitable manner in time with the other moving parts of the press.

The lower end of the reciprocable detector head stem 32 is formed with an enlarged diameter cylindrical stem portion or plunger 43 (Figs. 7, 8, 9, 10) which is surrounded by and slidably operates in a sleeve member 44. A collar 45 threadedly engaged in the upper end of the sleeve member 44 confines the stem plunger 43 within the sleeve member. The sleeve member 44 in turn slidably operates in a vertical bearing or housing 47 which is integral with the subframe 36 and which is in axial alignment with a sleeve member stop pad 48 also integral with the sub-frame and projecting under the indexing disc 22 so that the disc and hence the holders 21 with their collars B operate horizontally between the stop pad 48 and the lower end of the housing 47.

The stem 32 is yieldably disposed in an axial direction, relative to the sleeve member 44 by way of a compression spring 51 which is partially located in an axial bore 52 in the lower end of the stem plunger 43. The lower end of the spring 51 is confined in an axial socket 53 formed in a transverse partition wall 54 of the sleeve member 44. The spring 51 operates to force the stem plunger 43 upwardly in the sleeve member 44 and thus normally keeps the upper end of the plunger against the collar 45 in the upper end of the sleeve member as shown in Fig. 7.

Detection of a projection A on a collar B preferably is effected by a plurality of detecting fingers 56 which are mounted intermediate their ends on pivot pins 57 carried in the partition wall 54 of the sleeve member 44 (see also Fig. 11). The drawings show five of these detecting fingers 56 equally spaced around the periphery of the sleeve member 44 although any number may be used depending upon the number of lugs F to be formed on the collar B. There should be one detecting finger 56 for each lug F, since the purpose of the fingers is to relocate the projections A between a pair of adjacent lugs F.

The detecting fingers 56 are vertically disposed in grooves 59 formed in the lower portion of the sleeve member 44. At their lower ends the fingers 56 are provided with broad curved detecting lips 61 (see also Fig. 12) which operate in broadened slots 62 in the lower end of the sleeve member. The lips 61 preferably are of a width substantially equal to the length of the collar lugs F. At their upper ends, the fingers 56 are provided with a flat head 64, the inner face of which projects inwardly of the fingers to provide a partially tapered and partially vertical wedge shaped cam face 65 which normally engages against a corresponding reversely disposed wedge shaped cam 66 on the lower end of the stem plunger 43.

Below the flat heads 64, the fingers 56 are formed with V-shaped notches 67 which retain an endless coiled spring 68 which encircles the sleeve member 44 and yieldably urges the finger cam faces 65 into engagement with the wedge shaped cam 66 on the stem plunger. An auxiliary groove 69 in the sleeve member 44 is provided to retain the spring in the spaces between the fingers.

Above the flat heads 64 of the detecting fingers 56, the stem plunger 43 is provided with an annular clearance groove 71 of a width sufficient to accommodate the finger heads 64. Surrounding this groove 71 is an annular shoulder or in-place detector element 72 which when a projection A on a collar B is in proper place, is adapted to detect such a condition by engaging against the flat head 64 of one of the detecting fingers 56 as will be hereinafter explained.

In operation, the indexing disc 22 advances a pocket or holder 21 with its received collar B into position under the detecting head 31 and brings it to rest in axial alignment with the detecting head stem 32. Immediately the face cam 38, through the actuating lever 34 pushes the detecting head stem 32 down from the normal position shown in Fig. 7 to and through the position shown in Fig. 8 to the position shown in Fig. 9.

During this downward movement the sleeve member 44 moves with the stem 43 and enters the collar B and abuts against the stop pad 48 as shown in Fig. 8. The stop pad 48 arrests further downward movement of the sleeve member 44 and thereby locates and holds the detecting lips 61 of the detecting fingers 56 in a proper position relative to the height of the collar B to detect the position of the collar projection A.

As the stem 32 continues to move down, it compresses the axially disposed spring 51 as shown in Fig. 9, and this causes the wedge shaped cam 66 on the stem plunger 43 to descend below and thus ride off of the cam faces 65 on the detecting fingers 56. This action permits the encircling spring 68 to draw the upper ends of the fingers inwardly, with the result that the fingers are rocked on their pivot pins 57 and their lower ends, including their detecting lips 61 are pushed outwardly toward the inner face of the collar B as shown in Fig. 9.

If the projection A on the collar B is in the wrong place so as to require orientation of the collar in its holder 21, the encircling spring 68 will rock the detecting fingers 56 their maximum amount so as to push their detecting lips 61 far enough outwardly to engage or nearly engage the inner face of the collar B. A projection A in such a wrong place will be disposed somewhere between any two adjacent detecting fingers, thus the detecting lips 61 of these two fingers will be in lateral alignment with the projection A.

In this fully rocked condition of the detecting fingers 56, their flat heads 64 at their upper ends, align vertically with the clearance groove 71 in the stem plunger 43 as shown in Fig. 9 and thus enter the groove and permit the stem 32 to continue its downward movement until it is completed. At the bottom of this stroke a signalling pin 74 (Figs. 7, 8, 9, 10) carried by the stem plunger 43 and protruding outwardly through aligned slots 75, 76 in the sleeve member 44 and the housing 47 respectively, engages against and actuates and closes a normally open electric switch 77 which is included in a signalling circuit as will be hereinafter explained to signal in any suitable manner that the projection A is in the wrong place and that orientation of the collar B is required. In the instant invention, as will be hereinafter explained, this signal is utilized at a subsequent operating station in the apparatus to control actuation of the orienting device 70.

If the projection A on the collar B is in the right place so as to require no orientation of the collar, the detecting lip 61 on one of the detecting fingers 56 will radially align with the projection A so that when the encircling spring 68 rocks the detecting fingers as explained above, the lip 61 on the finger adjacent the projection A will engage against the projection as shown in Figs. 10 and 16 and will thus prevent full rocking of this one finger.

This action prevents the head 64 of the partially rocked finger from aligning with the clearance groove 71 in the stem plunger 43 and thus causes the in-place detector shoulder 72 on the stem plunger to engage against the finger head 64 with the result that further downward movement of the stem 32 is arrested and hence the signalling pin 74 is prevented from engaging and closing the signalling switch 77. The remaining portion of the down stroke of the stem 32 is absorbed by a compression spring 78 (Fig. 2) which surrounds a reduced diameter portion of the stem and which is interposed between the cross-bar 33 and a shoulder 79 on the stem.

This arresting of the descent of the stem 32 signals that the projection A is in the proper place for further treatment of the collar B. In the instant invention this signal is relayed to the orienting device 70 to render it inoperative of this one collar B when this collar reaches the device. An explanation of the orienting device and its cooperation with the detector device will now be given.

The orienting device 70 preferably is located adjacent the detecting device 31, at an orienting station K into which the collar B at the detecting station H is immediately indexed upon the next indexing movement of the disc 22 immediately following the detecting operation. This orienting device 70 is similar in construction to the detecting device 31 and preferably comprises a vertical, axially movable stem 81 (Figs. 5 and 6) which is reciprocated simultaneously with the detector stem 32 in time with the indexing of the collar holders 21 into and out of the stations H, K. For this purpose the upper end of the orienting stem 81 is attached to the same horizontal cross-bar 33 to which the detecting stem 32 is attached. Therefore the one face cam 38 controls the reciprocation of both stems 32, 81.

Intermediate its ends, the orienting stem 81 is formed with an enlarged diameter cylindrical stem portion or plunger 82 which is surrounded by and slidably operates in a sleeve member 83 having a bottom wall 84. A collar member 83 confines the stem plunger 82 within the sleeve member. The sleeve member 83 in turn slidably operates in a vertical bearing or housing 87 which is integral with the sub-frame 36 and which is in axial alignment with a sleeve member stop pad 88 also integral with the sub-frame and projecting under the indexing disc 22 like the detecting device stop pad 48, so that the disc and hence the holders 21 with their collars B operate horizontally between the stop pad 88 and the lower end of the housing 87.

The orienting device stem 81 is yieldably disposed in an axial direction, relative to the sleeve member 83 by way of a compression spring 91 which surrounds the stem 81 between the stem plunger 82 and the bottom wall 84 of the sleeve member. The spring 91 forces the stem plunger 82 upwardly against the collar 86 in the upper end of the sleeve member and thus normally holds the sleeve member in suspension with its bottom end above and clear of the path of travel of the indexing disc 22.

The lower end of the orienting stem 81 is slidably disposed in a bore 93 in the bottom wall 84 of the sleeve member 83. This end of the stem 81 terminates in a tapered or wedge shaped cam face 94 which normally is disposed adjacent correspondingly tapered or wedge shaped cam faces 95 (see also Fig. 18) on a plurality of radially disposed orienting fingers 96 horizontally slidable in radial slots 97 (see also Figs. 14, 15) formed in the bottom wall 84 and communicating with the bore 93 of the sleeve member 83. A plate 98 attached to the bottom of the sleeve member 83 holds the fingers in place in the slots 97 while an encircling endless spring 99 disposed in V-shaped grooves 101, 102 in the fingers 96 and in the sleeve member 83 between the fingers, respectively holds the fingers yieldably in an inward or retracted position with their inner ends adjacent the terminal end of the stem 81.

There are five of these orienting fingers 96 to correspond with the five detecting fingers 56 and they are normally located in the same relative position to the collar holders 21 as the detecting fingers. Like the detecting sleeve member 44, the orienting sleeve member 83 is adapted to be inserted into the collar B in its holder 21. Each of the orienting fingers 96 along their outer edges is provided with a curved horizontal lip 104 which corresponds to the detecting lips 61 and which are substantially the same length as the detecting lips.

When the indexing disc 22 advances a pocket or holder 21 from the detecting station H to the orienting station K and brings it to rest in axial alignment with the orienting stem 81 as shown in Fig. 5, the stem 81, is immediately pushed down by the face cam 38 and for an out of place collar projection A, the sleeve member 83 moves down with the stem and enters the collar B as shown in Fig. 6. When the bottom of the sleeve member 83 engages against the stop pad 88 as shown in Fig. 6 its movement is arrested and the stem continues to move down to complete its down stroke. The arresting of the down movement of the sleeve member 83 locates the orienting lips 104 of the fingers 96 at a level in the horizontal plane of the collar projection A, and the continued movement of the stem 81, engages its lower terminal end against the wedge shaped cam faces 95 of the orienting fingers 96 and spreads them radially outward toward the collar B in its holder 21 as shown in Figs. 6 and 14.

While the orienting fingers 96 are held in this expanded position, the sleeve member 83 to which they are attached is partially rotated through an angle of approximately 36 degrees to shift the fingers laterally and thus cause one of the fingers, i.e. the finger nearest the collar projection A, to engage the projection as shown in Fig. 15 and to rotate it together with the collar, into the desired proper position, which position will be anywhere in the arc, approximately 36 degrees, normally covered by the curved lip 104 of the next adjacent finger 96.

In this position the projection A is out of the way of the subsequent die action to be effected to produce the locking lugs F on the collar B, it being understood that the lugs are to each occupy the 36 degree space between the adjacent ends of the curved lips 104 on adjacent fingers 96. When the fingers 96 have been rotated into this projection rotating or orienting position they are held stationary until after the stem 81, upon its upward or return stroke, at least lifts the sleeve member 83 out of and clear of the collar B so as to leave the projection A in its relocated position. Otherwise an immediate return of the fingers to their normal positions would push the projection A back into an improper position.

The partial rotation of the sleeve member 83 and the orienting fingers 96 attached thereto is effected preferably by cam action and through an oscillation of the orienting stem 81. For this purpose the stem plunger 82 is connected to the sleeve member 83 by way of a key 106 (Figs. 5 and 6) which is secured to the stem plunger 82 and which slidably operates in a slot 107 in the sleeve member 83 so that the sleeve member rotates with the stem without interfering with the axial movement of the stem relative to the sleeve member.

Above the sleeve member 83, the stem 81 is keyed slidably to an oscillating collar 108 (Figs. 3, 5 and 6) which surrounds the stem and which is rotatably confined in the upper end of the housing 87. The collar 108 is attached, eccentrically and pivotally, to one end of a link 111 which extends through an opening 112 in the housing 87. The outer end of the link 111 is connected to one end of a rocker arm 113 (Fig. 2) which intermediate its ends is mounted on a pivot pin 114 carried in the subframe 36. The opposite end of the rocker arm 113 carries a cam roller 116 which operates against a suitable cam, such as an edge cam 117 mounted on and rotating with the cam shaft 39 so that the oscillating action on the orienting stem 81 will be properly timed with its reciprocation.

If the projection A on the collar B is in the right place so as to require no orientation of the collar by the orienting device 70, the orienting stem 81 moves down through its full stroke as usual and returns, but the sleeve member 83 is held against movement. This action withholds the sleeve member 83 and its attached orienting fingers 96 from entering the collar B and thus renders them inoperative and leaves the collar B and its projection A in the holder 21 in the position it was received and detected at the detecting station H. The sleeve member 83 remains in its normal position as shown in Fig. 5, but the expansion of the fingers 96 and the oscillation of the sleeve member takes place as usual but without effect on the collar B.

This withholding action on the sleeve member 83 is controlled by the signalling device switch 77 (Fig. 7) of the detecting device 31 and is effected electrically through circuits which control a locking finger 121 (Figs. 5 and 6) which is surrounded by a normally deenergized electric solenoid 122 attached to the side of the orienting housing 87. The locking finger 121 extends through an opening 123 in the side of the housing 87 and normally is urged by a tension spring 124 into a wide clearance opening 125 in the sleeve member 83. The opening 125 is wide enough to permit oscillation of the sleeve member 83 through its usual cycle without lateral interference with the locking finger. The inner end of the locking finger 121 along its upper edge is formed with an inclined hook or wedge 127 which is adapted to hook under a correspondingly inclined or wedge shaped edge 128 on the sleeve member 83 along the top of the opening 125.

In operation, the solenoid 122 is energized, through closing of the detector switch 77, every time a collar is received at the detecting station H with its projection A in the wrong place and thus the locking finger 121 is withdrawn from the clearance opening 125 in the orienting sleeve member 83 to permit of a full stroke of the sleeve member into the collar and an oscillating or orienting stroke, when the collar is received at the orienting station K. It should be observed that the detecting switch 77 is actuated at the bottom of the down stroke of the detecting stem 32, and while the detecting stem 32 is moving up, the collar B in the holder 21 of the disc 22 is indexed into the orienting station K before the orienting stem 81 begins its down stroke to orient the received collar B. Hence there is sufficient time for the locking finger 121 to be withdrawn from the orienting sleeve member 83 before it begins a down stroke.

Accordingly when a collar B is received at the detecting station H with the projection A in the right place and the detector switch 77 is thereby left unactuated as explained hereinbefore, the solenoid 122 remains in its normal deenergized condition and hence the locking finger 121 is left in its normal extended position in the opening 125 of the orienting sleeve member 83 or is urged by the spring 124 into this opening upon the sleeve member reaching the top of its return stroke and thus engages against the wedge shaped edge 128 of the sleeve member opening 125 and hence holds the sleeve member 83 against descent with the orienting stem 81 as hereinbefore explained. When this condition obtains the hooked face 127 on the locking finger 121 hooks under the wedge shaped edge 128 in the sleeve member opening 125 and thereby holds the locking finger against disengagement when the next collar at the detecting station H is detected as having an out-of-place projection A which will cause energization of the locking finger solenoid 122 at the bottom of the down stroke of the stems 32, 81. Thus the locking finger 121 will remain in locking position until the stems 32, 81 and their sleeve members 44, 83 reach the top of their return stroke in readiness for a repeat cycle.

Energization of the locking finger solenoid 122 is effected through a series of electric circuits connected with a suitable source of electric current such as a generator 131 (Fig. 4). When the detector switch 77 is closed, current from the generator 131 flows along a wire 132 to and through the closed switch 77, a wire 133, a normally deenergized solenoid 134 of a pair of normally open relay switches 135, 136, thence along a wire 137 back to the generator. This current energizes the relay solenoid 134 and thus closes both of the relay switches 135, 136.

Closing of relay switch 136 immediately energizes the locking finger solenoid 122 through a circuit wire 141 connecting with wire 137 and wires 142, 143 connecting the relay switch 136 with the wire 132 and the finger solenoid 122. A holding circuit is also immediately established to hold the relay solenoid 134 energized and thus hold the finger solenoid 122 energized after opening of the detector switch 77 upon the up stroke of the detector stem. Current for this holding circuit flows from wire 132 along a wire 145, to and through closed relay switch 135, a wire 146 to a normally closed breaker switch 147 and thence along a wire 148 to wire 133, relay solenoid 134, and wire 137 to the generator.

Deenergization of the finger solenoid 122 after an energizing operation takes place on the down stroke of the detecting and orienting stems 32, 81 and just before a probable reclosing of the detector switch 77 so as to compensate for the travel of a collar from the detecting station H to the orienting station K. This deenergization of the finger solenoid is effected by a breaking of the relay holding circuit which is effected by an opening of the breaker switch 147. The breaker switch is opened momentarily at the proper time in the operating cycle, by a rotating finger 151 which is mounted on and rotates with the cam shaft 39 (see also Figs. 1 and 2). The breaking of the holding circuit by the opening of the breaker switch 147 breaks all of the circuits and thus returns the locking finger 121 and the circuits to their normal condition.

It will be understood that although the described embodiment of the invention is shown operating on collars, it is not so limited, and is equally well adapted for use with other types of articles which must be similarly oriented.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for orienting articles to dispose a projection thereon in predetermined position, comprising a holder for a said article, a vertically reciprocable orienting head disposed in vertical axial alignment with said holder, an orienting finger in said head, finger moving means vertically reciprocable within and relative to said head, means for actuating said finger moving means to shift said fingers radially outwardly of said head to laterally align said finger with said projection, and means for rotating said orienting head on its vertical axis to engage said finger against said projection to thereby rotate said article in said holder to shift said projection into a predetermined non-interfering position for a subsequent operation upon said article.

2. An apparatus of the character defined in claim 1 wherein a plurality of said orienting fingers are disposed in circumferentially spaced relation around said head for selective shifting and utilization to orient said article for the purpose described.

3. An apparatus of the character defined in claim 1 wherein said head is insertable into said holder for orienting articles each having an internal projection thereon.

4. An apparatus of the character defined in claim 1 wherein said finger is mounted for shifting movement within and radially of said head and means for yieldably holding said finger in a retracted position within said head and cam means engageable against said finger for shifting it radially outwardly into article projection engaging position.

5. An apparatus of the character defined in claim 2 wherein said finger moving means comprises a vertically reciprocably axially movable stem member, a finger actuating cam on said stem member, and said head comprises a surrounding sleeve member is mounted for axial reciprocation on and relative to said stem member, said plurality of fingers being mounted on said sleeve member, and said finger rotating means is connected to said sleeve member.

6. An apparatus of the character defined in claim 5 wherein said sleeve member is spring loaded for vertical reciprocation on and relative to said stem axially.

7. An apparatus of the character defined in claim 5 and means for arresting movement of said sleeve member in a predetermined position relative to said sleeve member to locate said fingers adjacent said article and to effect outward radial shifting of said fingers by said cam means.

8. An apparatus of the character defined in claim 1 and a rotatable disc having a plurality of holders disposed in circumferentially spaced relation thereon, and means for shifting said element to successively index and register said holders and the articles carried thereby with and beneath said head.

9. An apparatus for orienting articles to dispose a projection thereon in predetermined position, comprising a holder rotatable on a vertical axis for receiving said article in an uncontrolled relation, vertically reciprocable detector means disposed above said article at a detecting station for detecting deviation of said projection from a predetermined non-interfering position in said holder for a subsequent operation on said article, orienting means vertically reciprocable relative to said projection at an orienting station for rotating said article in said holder to shift said projection into said predetermined position when detected in an improper position, means for rotating said holder in a horizontal plane from said detecting station to said orienting station, and means operable by said detector means for rendering said orienting means ineffective when said projection is detected in a proper position, said last mentioned means being operable by said detector means to render said orienting means effective to rotate said article at said orienting station when said article projection is detected in an improper position.

10. An apparatus of the character defined in claim 1 wherein said orienting means is an oscillatable sleeve movable into said article and said sleeve is provided with at least one finger to engage and rotatably shift an out-of-place projection into a predetermined in-proper-place position and having means for rotatably oscillating said sleeve, means for locking said sleeve in inoperative vertical position to withhold said finger from engagement with said in-proper-place projection and wherein said means for detecting an out-of-place projection is operative to release said locking means to permit rotative operation of said orienting sleeve on said out-of-place article projection.

11. An apparatus of the character defined in claim 10 wherein said locking means is a wedge shaped tongue engageable against a wedge faced shoulder on said orienting sleeve and having means for shifting said tongue into the path of travel of said shoulder to lock said sleeve in an inoperative position spaced vertically upwardly from said article.

12. An apparatus of the character defined in claim 11 having electric means connected to said tongue and to said detector means and operable by said detector means for urging said tongue into an inoperative relation to said sleeve shoulder to render said sleeve rotatably operative upon an article having an out-of-place projection.

13. An apparatus of the character defined in claim 9 wherein said vertically reciprocable detector means comprises an axially movable stem, a surrounding sleeve slidably mounted for vertical reciprocation on and relative to said stem, a plurality of laterally and radially movable detector fingers carried by said sleeve, means for moving said stem downwardly toward said holder, a cam on said stem member for engaging and shifting one of said fingers into internal engagement with said article, and wherein said means operable by said detector is a locking member connected to said detector stem and to said orienting sleeve and operable by a predetermined axial downward movement of said detector stem toward said holder for controlling the orienting movement of said sleeve for repositioning circumferentially an out-of-place projection on said article.

14. An apparatus of the character defined in claim 13 wherein said detector means is provided with an in-place detector finger pivotally on said detector stem, said finger being engageable against one of said radially shiftable article engaging fingers when said pivotally mounted finger detects a properly placed projection during the downward vertical movement of said detector stem to arrest further movement of said stem and arrest operation of said locking means to render said orienting means ineffective on said properly placed article projection.

15. A detector apparatus for detecting properly and improperly placed projections on articles, comprising a holder for receiving a said article in an indiscriminate uncontrolled position, an axially movable detector stem disposed adjacent said holder, a surrounding detector sleeve slidably mounted on said stem, a plurality of movable detector fingers pivotally mounted on said sleeve, means for moving said stem toward said holder, a cam on said stem for pivotally moving one of said fingers into engagement with said article, and a detector signalling device operable by said detector stem upon completion of a predetermined axial movement thereof when any one of said fingers detects a said projection in an out-of-place position.

16. A detector apparatus of the character defined in claim 15 wherein said detector stem is provided with an in-place detector element engageable against any one of said pivotally mounted fingers when the latter detects a properly placed projection during the movement of said detector stem to arrest the movement of said stem and thereby withhold operation of said detector signalling device.

17. A detector apparatus of the character defined in claim 15 having means for arresting movement of said sleeve in a predetermined vertical position relative to said article holder to locate said pivotally mounted fingers adjacent said article and to effect actuation of said fingers by said cam.

18. Apparatus as defined in claim 1, wherein said articles comprise cylindrical can collars each having an internal side seam projection thereon.

References Cited in the file of this patent

UNITED STATES PATENTS

| | | |
|---|---|---|
| 2,140,246 | O'Neil | Dec. 13, 1938 |
| 2,353,184 | Nordquist | July 11, 1944 |
| 2,810,248 | Dimond | Oct. 22, 1957 |